United States Patent

[19]

Kerschner et al.

[11] Patent Number: 5,995,243
[45] Date of Patent: Nov. 30, 1999

[54] ILLUMINATION SYSTEM WITH WHITE LEVEL CALIBRATION FOR HAND-HELD SCANNER

[75] Inventors: Ronald K. Kerschner; David K. Campbell, both of Loveland, Colo.

[73] Assignee: Hewlett-Packard Company, Palo Alto, Calif.

[21] Appl. No.: 08/878,429

[22] Filed: Jun. 18, 1997

[51] Int. Cl.⁶ .................................................. H04N 1/40
[52] U.S. Cl. ............................................ 358/461; 358/475
[58] Field of Search ........................... 358/461, 473–474, 358/475, 446; 250/578.1

[56] References Cited

U.S. PATENT DOCUMENTS

| | | | |
|---|---|---|---|
| 3,911,213 | 10/1975 | Tregay et al. | 358/474 |
| 4,703,186 | 10/1987 | Nakayama et al. | 250/566 |
| 4,709,144 | 11/1987 | Vincent | 250/226 |
| 4,819,083 | 4/1989 | Kawai et al. | 358/294 |
| 4,870,268 | 9/1989 | Vincent et al. | 250/226 |
| 4,894,523 | 1/1990 | Chadima, Jr. et al. | 235/472 |
| 4,899,228 | 2/1990 | Sano et al. | 358/473 |
| 4,926,041 | 5/1990 | Boyd | 250/226 |
| 4,967,188 | 10/1990 | Collins, Jr. | 340/636 |
| 4,969,054 | 11/1990 | Tsuji et al. | 358/473 |
| 5,019,703 | 5/1991 | Boyd et al. | 250/208.1 |
| 5,032,004 | 7/1991 | Steinle | 350/171 |
| 5,038,028 | 8/1991 | Boyd et al. | 250/208.1 |
| 5,040,872 | 8/1991 | Steinle | 359/638 |
| 5,044,727 | 9/1991 | Steinle | 350/171 |
| 5,182,450 | 1/1993 | Pan | 250/234 |
| 5,227,620 | 7/1993 | Elder, Jr. et al. | 250/208 |
| 5,278,674 | 1/1994 | Webb et al. | 358/475 |
| 5,301,243 | 4/1994 | Olschafskie et al. | 382/59 |
| 5,306,908 | 4/1994 | McConica et al. | |
| 5,381,020 | 1/1995 | Kochis et al. | |
| 5,410,347 | 4/1995 | Steinle et al. | 348/270 |
| 5,434,680 | 7/1995 | Noda et al. | 358/471 |
| 5,552,597 | 9/1996 | McConica | |
| 5,586,212 | 12/1996 | McConica | |

FOREIGN PATENT DOCUMENTS

| | | |
|---|---|---|
| 0270686 | 6/1988 | European Pat. Off. |
| 0168256 | 1/1986 | Japan |
| WO 8801123 | 2/1988 | WIPO |

OTHER PUBLICATIONS

Modern Optical Engineering, The Design of Optical Systems–Second Edition, Warren J. Smith pp. 436–453, Copyright 1990 by McGraw–Hill, Inc.
Document No. vol. 12No. 256, Jul. 19, 1988, Mitsubishi Electric.
Document No. vol. 17No. 152, Mar. 25, 1993, Canon, Inc. Japan.
Document No. 08/601,276, Jan. 29, 1996, Kerscher et al.
Document No. 08/592,904, Jan. 29, 1996, Kerscher et al.

*Primary Examiner*—Thomas D. Lee

[57] ABSTRACT

An illumination system for illuminating a scan region on an object and for providing a white level reference for a detector may comprise a light source for producing light rays and an elongate lens having a first end and a second end positioned between the light source and the scan region. The lens collects some of the light rays from the light source and directs them onto the scan region. A first spot lens is positioned adjacent the first end of the elongate lens and a second spot lens is positioned adjacent the second end of the elongate lens. The first and second spot lenses direct some of the light rays from the light source toward first and second ends of the scan line. A white level reference mark is positioned adjacent the lens and the light source so that some of the light rays from the light source are reflected by the white level reference mark to the detector.

25 Claims, 10 Drawing Sheets

ILLUMINATION SYSTEM WITH WHITE LEVEL CALIBRATION FOR HAND-HELD SCANNER

FIELD OF INVENTION

This invention relates to imaging devices in general and more specifically to hand-held or portable optical scanners.

BACKGROUND

Imaging devices, such as optical scanners, are well-known in the art and produce machine-readable image data signals that are representative of a scanned object, such as a photograph or a page of printed text. In a typical scanner application, the image data signals produced by an optical scanner may be used by a personal computer to reproduce an image of the scanned object on a suitable display device, such as a CRT or a printer.

A hand-held or portable optical scanner is an optical scanner which is designed to be moved by hand across the object being scanned. The hand-held scanner may be connected directly to a separate computer by a data cable. If so, the data signals produced by the hand-held scanner may be transferred to the separate computer "on the fly," i.e., as the image data are collected. Alternatively, the hand-scanner may include an on-board data storage system for storing the image data. The image data may then be downloaded to a separate computer after the scanning operation by any convenient means, such as via a cable or an optical infrared data link.

Hand-held or portable optical scanners are well-known in the art and various components thereof are disclosed in U.S. Pat. No. 5,552,597 of McConica for "Hand-Held Scanner having Adjustable Light Path", U.S. Pat. No. 5,586,212 of McConica, et al., for "Optical Wave Guide for Hand-Held Scanner," U.S. Pat. No. 5,381,020 of Kochis, et al., for "Hand-Held Optical Scanner with Onboard Battery Recharging Assembly," and U.S. Pat. No. 5,306,908 of McConica, et al., for "Manually Operated Hand-Held Optical Scanner with Tactile Speed Control Assembly," all of which are hereby incorporated by reference for all that they disclose.

A typical hand-held optical scanner may include an illumination system and an optical system. The illumination system illuminates the object and the optical system collects light reflected by the illuminated object and focuses a small area of the illuminated object, usually referred to as a "scan region" or "scan line," onto the surface of a photosensitive detector positioned within the scanner. Image data representative of the entire object then may be obtained by sweeping the illuminated scan line across the entire object, usually by moving the hand-held scanner with respect to the object. By way of example, the illumination system may include a white light source (e.g., a fluorescent or incandescent lamp or an array of light emitting diodes (LEDs)). The optical system may include a lens and/or mirror assembly to focus the image of the illuminated scan line onto the surface of the detector.

The photosensitive detector used to detect the image light focused thereon by the optical system may be a charge-coupled device (CCD), although other devices may be used. A typical CCD may comprise an array of individual cells or "pixels" each of which collects or builds-up an electrical charge in response to exposure to light. Since the quantity of the accumulated electrical charge in any given cell or pixel is related to the intensity and duration of the light exposure, a CCD may be used to detect light and dark spots on an image focused thereon. In a typical scanner application, the charge built up in each of the CCD cells or pixels is measured and then discharged at regular intervals, known as sampling intervals, which may be about 5 milliseconds or so for a typical scanner, although other sampling intervals may be used.

The term "image light" as used herein refers to the light that is focused onto the surface of the detector array by the optical system. Depending on the type of scanner and the type of document, the image light may be reflected from the document or object being scanned or it may be transmitted through the object or document. The image light may be converted into digital signals in essentially three steps. First, each pixel in the CCD detector converts the light it receives into an electric charge. Second, the charges from the pixels are converted into analog voltages by an analog amplifier. Finally, the analog voltages are digitized by an analog-to-digital (A/D) converter. The digital signals then may be processed and/or stored as desired.

One factor that affects the overall quality of the scanned image is the tonal resolution of the scanner. The tonal resolution is a measure of the number of different intensity levels (i.e., grayscale tones) that can be detected and recorded by the scanner. For example, an image scanner utilizing an 8-bit analog-to-digital (A/D) converter to convert the analog signals from the detector array into corresponding digital signals is capable of representing $2^8$ or 256 different intensity levels. The A/D converter returns a maximum value of 255 for a maximum intensity or "white" pixel and a minimum value of 0 for a minimum intensity or "black" pixel.

A scanner's "white intercept" or "white point," is the intensity of image light that results in a maximum value (i.e., full scale) output from the A/D converter of the scanner. Similarly, the "black intercept" or "black point" is the intensity of the image light (neglecting noise) at which the A/D converter returns a value of zero. Therefore, the bit depth of the A/D converter and the difference between the white and black intercepts determines the tonal resolution of the scanner.

Figure 1:
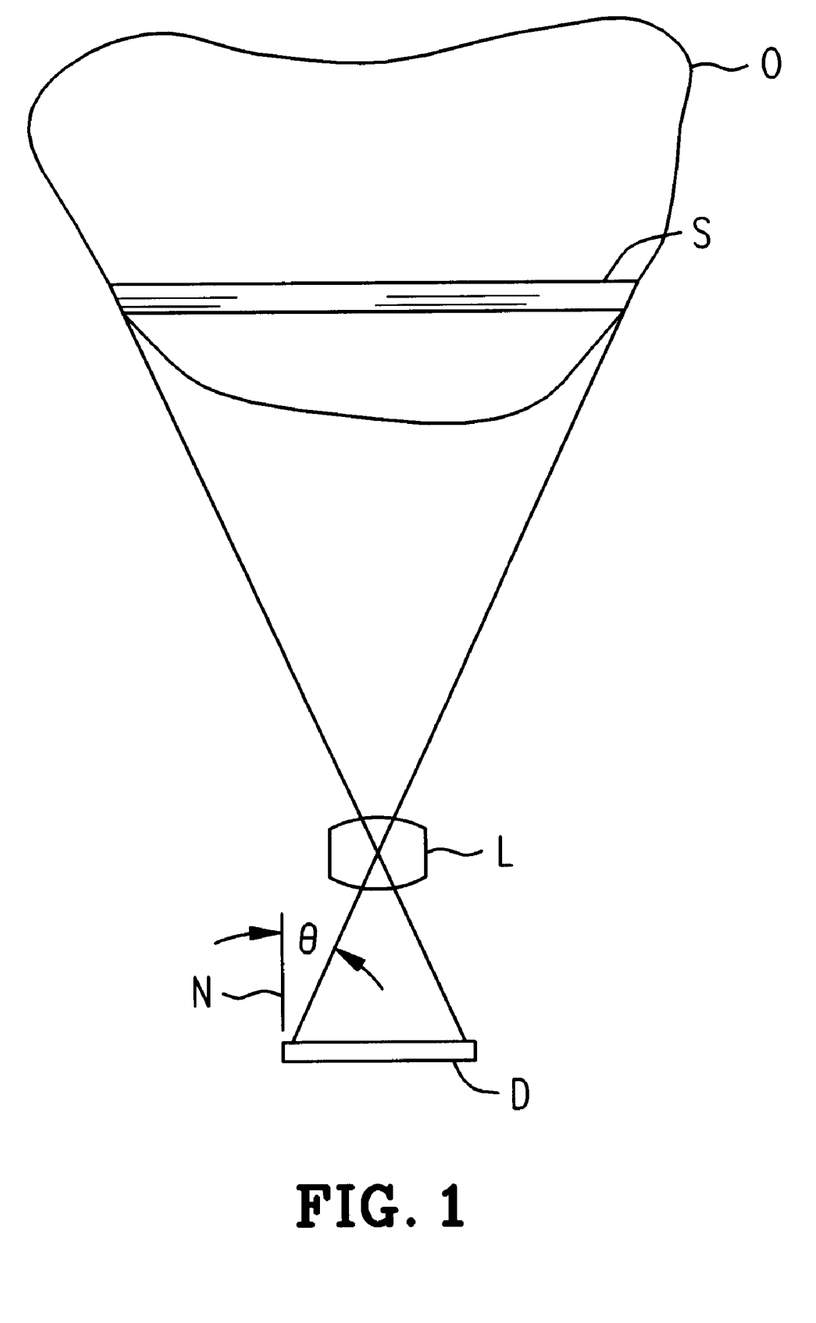
FIG. 1 is a schematic representation of a basic optical system for a scanner for focusing the image of an illuminated scan line onto the surface of a detector.

On problem associated with scanner apparatus of the type described above relates to providing substantially equal illumination along the entire length of the scan line. Referring now to FIG. 1, consider, for example, an illuminated scan line S on an object O, image light from which is focused onto the surface of a detector D by a lens assembly L. In order for the detector D to capture the desired detail of the object O along the entire length of the scan line S, all portions of the illuminated object O bounded by the scan line S should equally illuminate the surface of the detector D. Unfortunately, however, the illumination, i.e., the density of luminous flux, on the surface of the detector D varies inversely with the square of the distance from the illuminated object O and directly with the cosine of the angle θ between the luminous flux and the normal N to the surface of the detector D. Consequently, the illumination on the surface of the detector D tends to decrease towards each end, thereby reducing the effective sensitivity of the detector D for points that lay near each end of the scan line.

Another problem commonly associated with a scanner of the type described above relates to the gradual degradation over time of the light source used to illuminate the scan line. Generally speaking, the light output of most of the commonly used light sources tends to decrease with age. If peak image quality is to be maintained, it is necessary compensate for the reduced light output.

SUMMARY OF THE INVENTION

An illumination system for illuminating a scan region on an object and for providing a white level reference for a detector may comprise a light source for producing light rays and an elogate lens having a first end and a second end positioned between the light source and the scan region. The lens collects some of the light rays from the light source and directs them onto the scan region. A first spot lens is positioned adjacent the first end of the elongate lens and a second spot lens is positioned adjacent the second end of the elongate lens. The first and second spot lenses direct some of the light rays from the light source toward first and second ends of the scan line. A white level reference mark is positioned adjacent the lens and the light source so that some of the light rays from the light source are reflected by the white level reference mark to the detector.

BRIEF DESCRIPTION OF THE DRAWING

Illustrative and presently preferred embodiments of the invention are shown in the accompanying drawing in which.

DETAILED DESCRIPTION OF THE INVENTION

Figure 2:
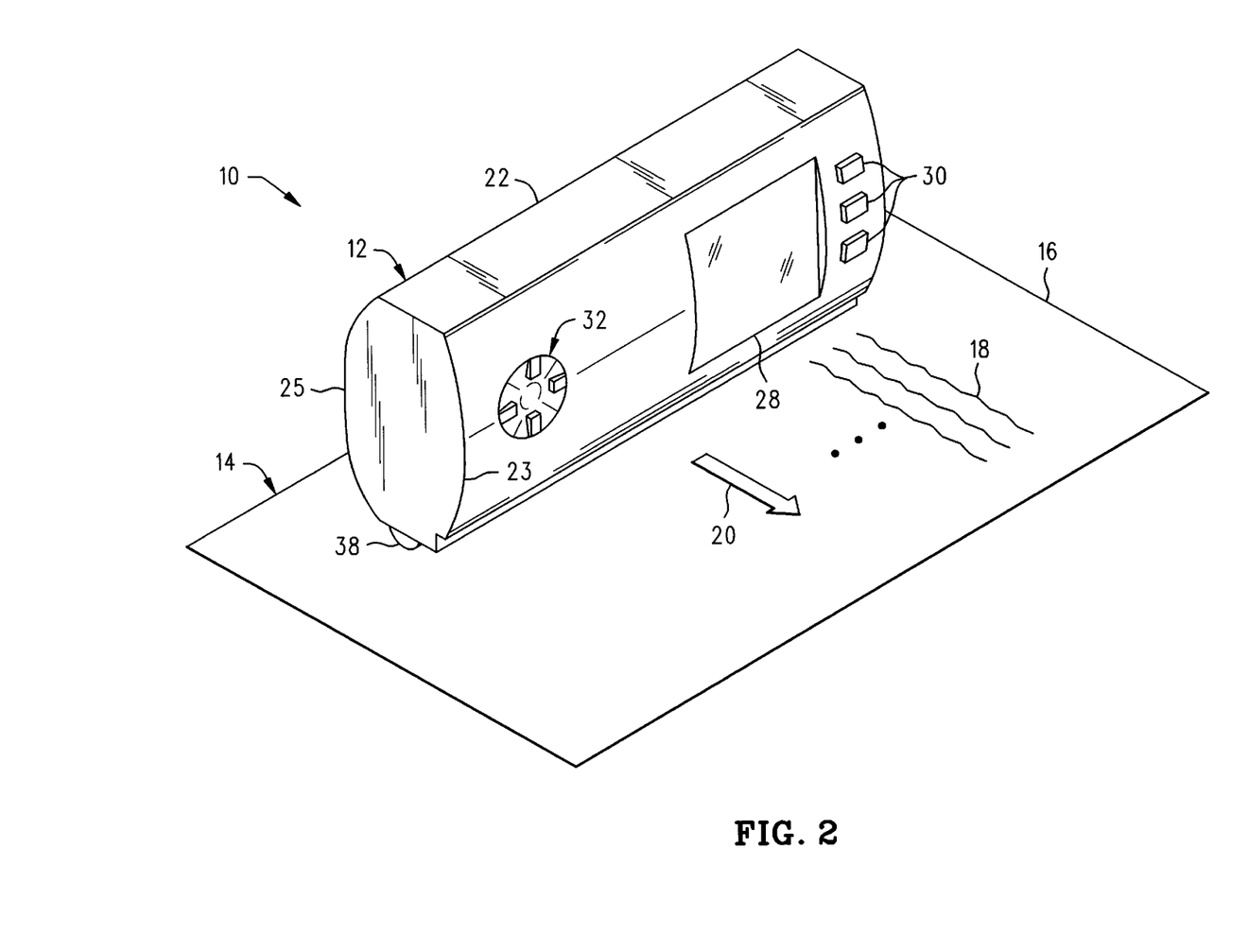
FIG. 2 is a perspective view of a hand-held scanner having an illumination and white point calibration system according to the present invention.
Figure 4:
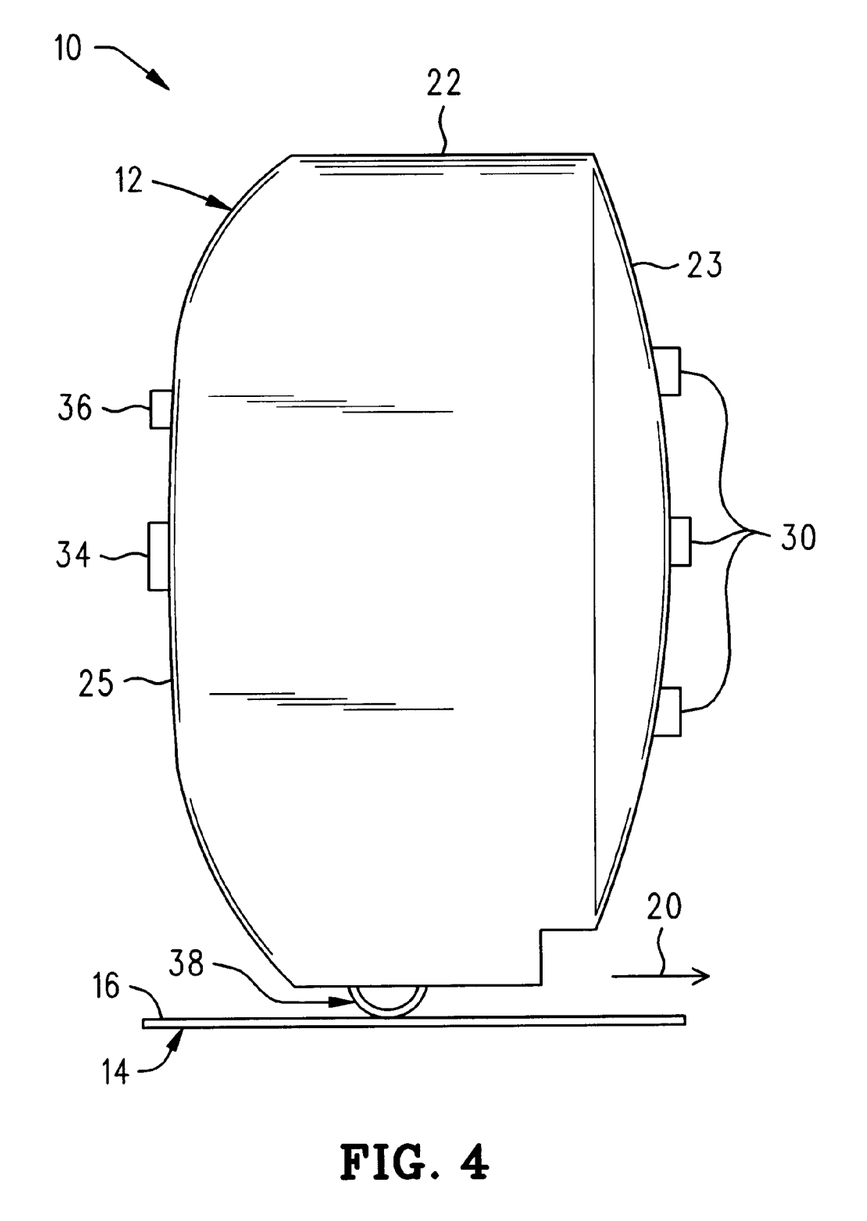
FIG. 4 is a side view in elevation of the hand-held scanner shown in FIG. 2.
Figure 5:
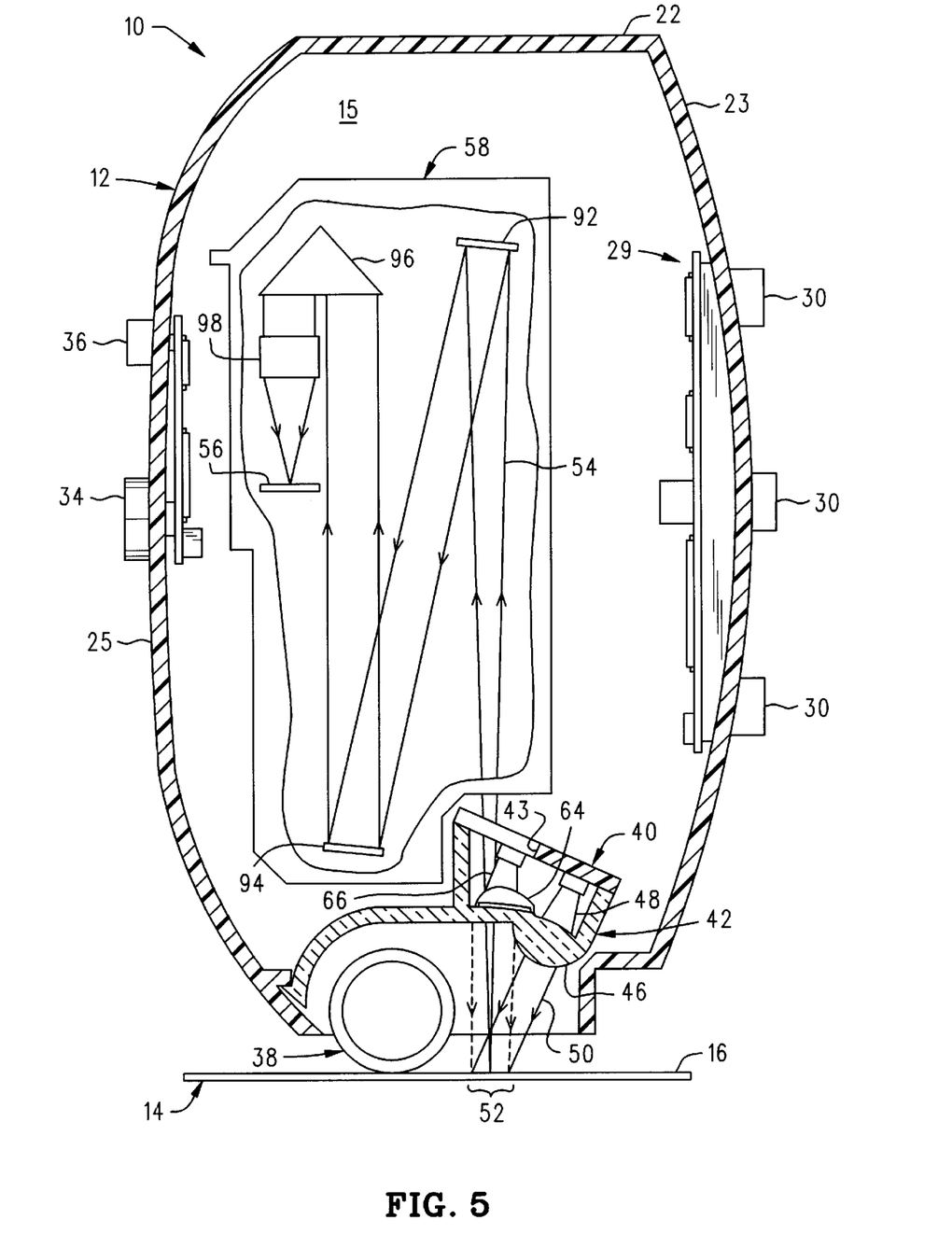
FIG. 5 is an enlarged sectional view of the hand-held scanner shown in FIGS. 2 and 4 showing the position and arrangement of the various components of the illumination and white point calibration system.

An illumination and white level calibration system 10 according to the present invention is shown in FIGS. 2, 4, and 5 as it could be incorporated into a hand-held scanner 12 of the type that may be used to scan an object 14, such as a piece of paper 16 with written text 18 thereon. The scanner 12 may be used to capture the image of the document 16 by moving the scanner 12 over the document 16 generally in a scan direction, as indicated by arrow 20. The illumination and white level calibration system 10 provides for improved illumination of the detector 56 (FIG. 5), particularly near the ends thereof, and provides for periodic white level calibration, both of which tend to improve the overall quality of the scanned image.

The hand-held scanner 12 may include an elongate housing or body 22 for housing the various internal components and systems required for the operation of the scanner, as will be described in greater detail below. The front side 23 of body 22 may be provided with a plurality of function buttons 30 and scrolling buttons 32. The front side 23 may also include a display 28, such as a liquid crystal display, for displaying data and/or function options of the scanner. The rear side 25 of body 22 may be provided with a scan button 34 and an on/off switch 36, as best seen in FIG. 4. The various function buttons 30, scrolling buttons 32, scan button 34, and on/off switch 36 may be used to control the various functions of the hand scanner 12 and to initiate and terminate scanning of the document 16. The body portion 22 of scanner 12 may also include an electrical power source, such as a battery (not shown), suitable for supplying the scanner 12 with electrical power.

Figure 10:
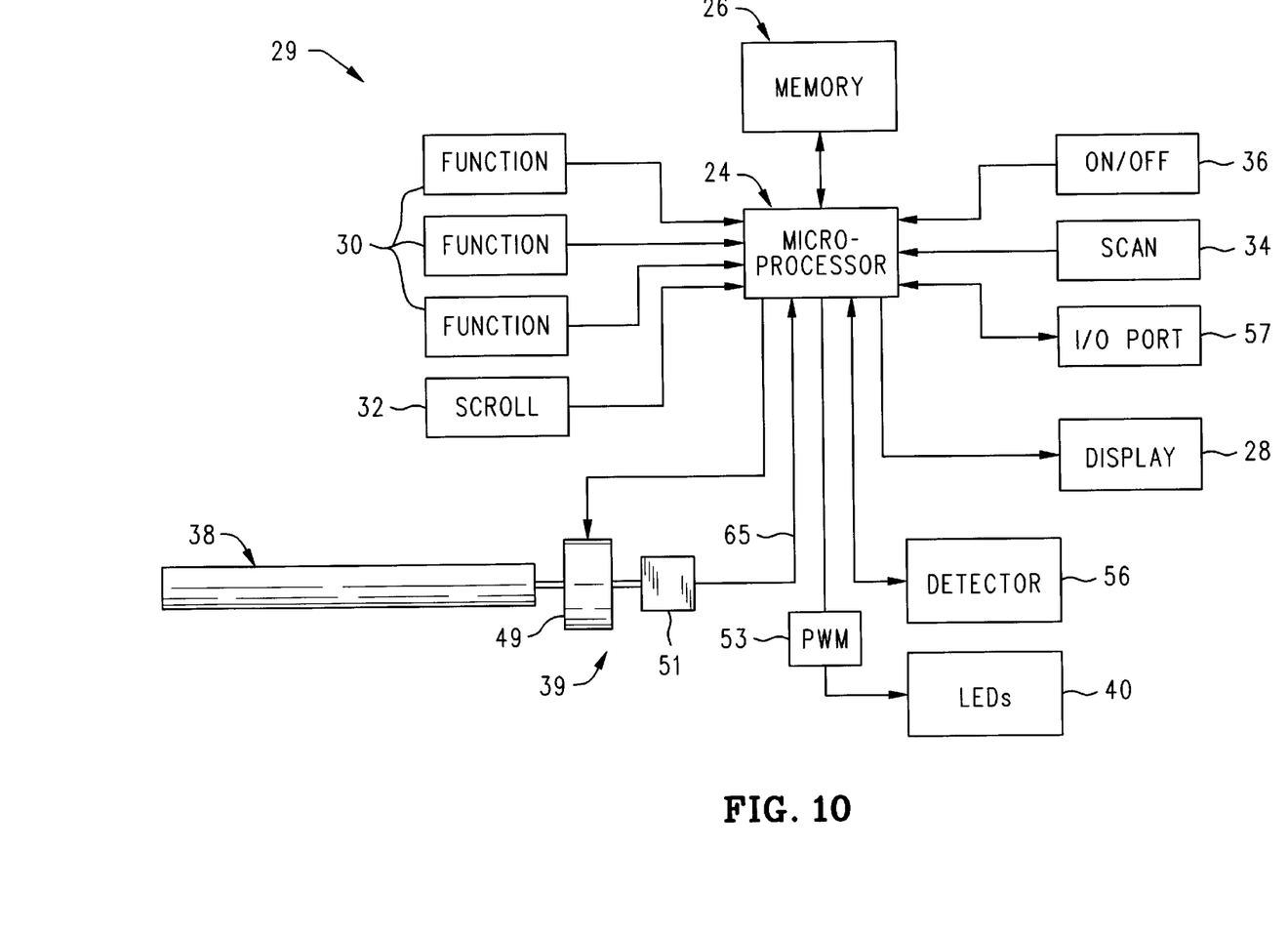
FIG. 10 is a high level block diagram of the image processing system of the hand-scanner apparatus.

Referring now specifically to FIG. 5, the interior 15 of body 22 is adapted to receive the illumination and white point calibration system 10. The illumination and white point calibration system 10 illuminates the scan region 52 and provides for periodic white level calibration. An optical system 58 collects image light 54 from the scan region 52 and focuses the image light 54 onto the detector assembly 56. An image processing system 29 (a block diagram of which is illustrated in FIG. 10) receives data signals (not shown) from the detector assembly 56 and processes the data signals as necessary to produce digital image data. The image processing system 29 may also control the other functions and operations of the scanner 12, as will be described in greater detail below. The interior 15 of body 22 may also include a roller system 38 to assist the user (not shown) in moving the scanner 12 over the object 14 being scanned. See FIG. 2. Of course, the body 22 of scanner 12 may also include other components and/or systems that may be necessary or desirable for the a hand scanner apparatus 12, as will be described below.

Figure 6:
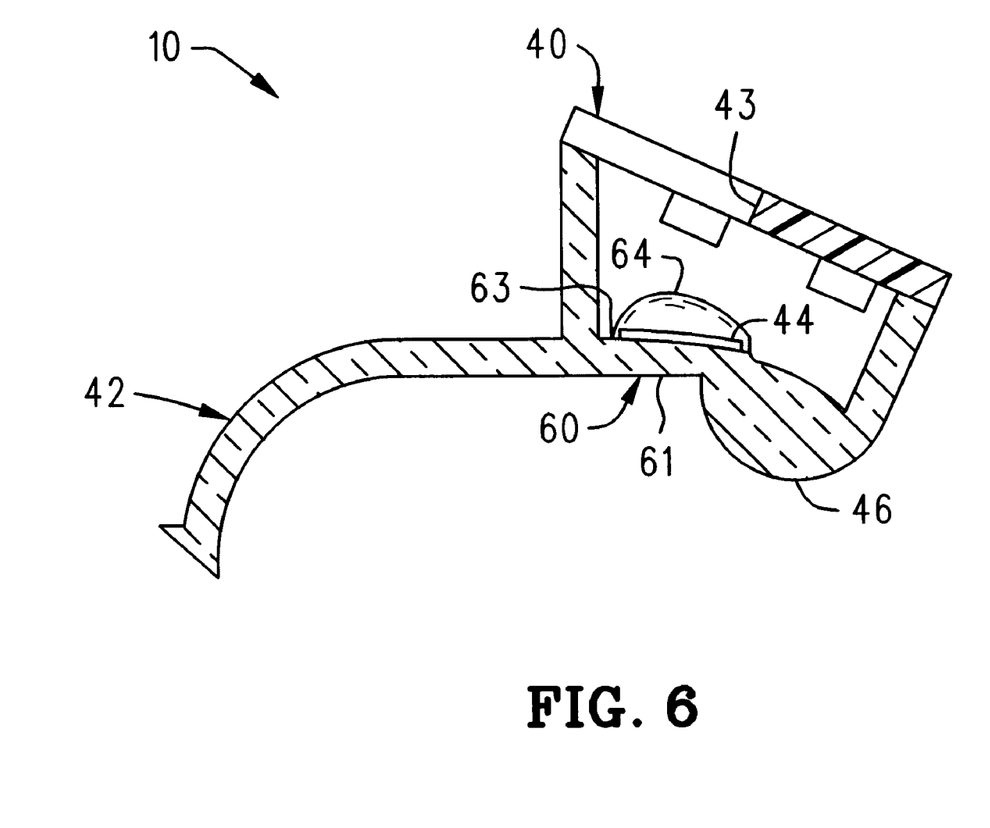
FIG. 6 is an enlarged sectional view of the combination lens/window assembly shown in FIG. 5.
Figure 7:
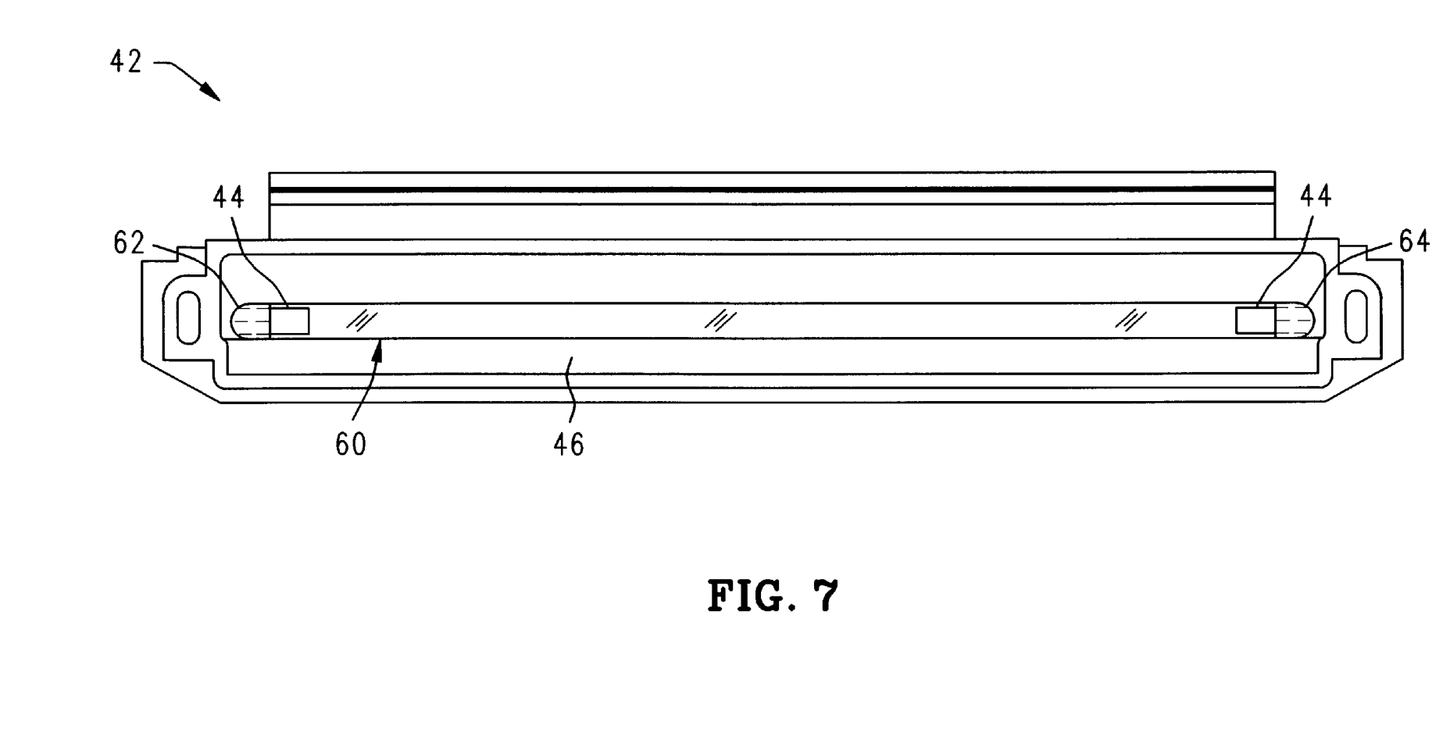
FIG. 7 is a plan view of the combination lens/window assembly.

Referring now primarily to FIG. 5–7, the illumination and white level calibration system 10 may include a light source assembly 40, a lens assembly 42, and a white level reference mark 44 (FIGS. 6 and 7). The lens assembly 42 may include an elongate aspheric collimating lens 46 which collects and collimates some of the light rays 48 produced by the light source assembly 40. A collimated beam 50 is then directed onto the document 16, illuminating the scan region 52. See also FIG. 3. Image light 54 reflected by the scan region 52 passes through window section 60 (FIG. 6) of lens assembly 40 and is collected and focused onto the surface of a detector 56 by optical system 58.

In one preferred embodiment, the lens assembly 42 includes a pair of spot lenses 62, 64 (FIG. 7) which direct additional light rays 66 onto the scan region 52 as respective spotlight beams, e.g., spotlight beam 68, as best seen in FIG. 5. The spot lenses 62, 64 are located near each end 70, 72 of the elongate scan region 52, as best seen in FIG. 7, and provide additional illumination 88, 90 near each end 70, 72 of the scan region 52. See FIG. 3.

Lens assembly 42 may also include a white level reference mark 44 positioned adjacent each spot lens 62, 64, as best seen in FIG. 7. Each white level reference mark 44 reflects a portion of the light rays 48, 66 produced by the light source assembly 40 and reflects them toward the optical system 58. Optical system 58 focuses the reflected rays on one or more white level pixels 86 contained the detector 56. See FIG. 8.

In order to scan an object 14 (e.g., a document 16 with printed text 18 thereon), the user (not shown) first positions the scanner apparatus 12 so that the roller 38 is positioned flat against the surface of the document 16. See FIG. 2. Then, after making the appropriate selections with the function buttons 30 and/or scrolling buttons 32, the user may initiate the scanning process by pressing the scan button 34 and by sweeping the scanner 12 across the document 16, generally in the scan direction 20. In one preferred embodiment, the roller assembly 38 includes a roller speed control system 39 (FIG. 10). Roller speed control system 39 assists the user in maintaining an appropriate scanning speed.

During the scanning operation, the illumination system 10 illuminates the scan region 52, thereby allowing the detector 56 to sense the information contained in the scan region 52. The spot lenses 62, 64 provide additional illumination 88, 90 near each respective end 70, 72 of the scan region 52, thereby helping to compensate for the illumination reduction that would otherwise occur near each end 70, 72 of the scan region 52, as was described above.

Figure 11:
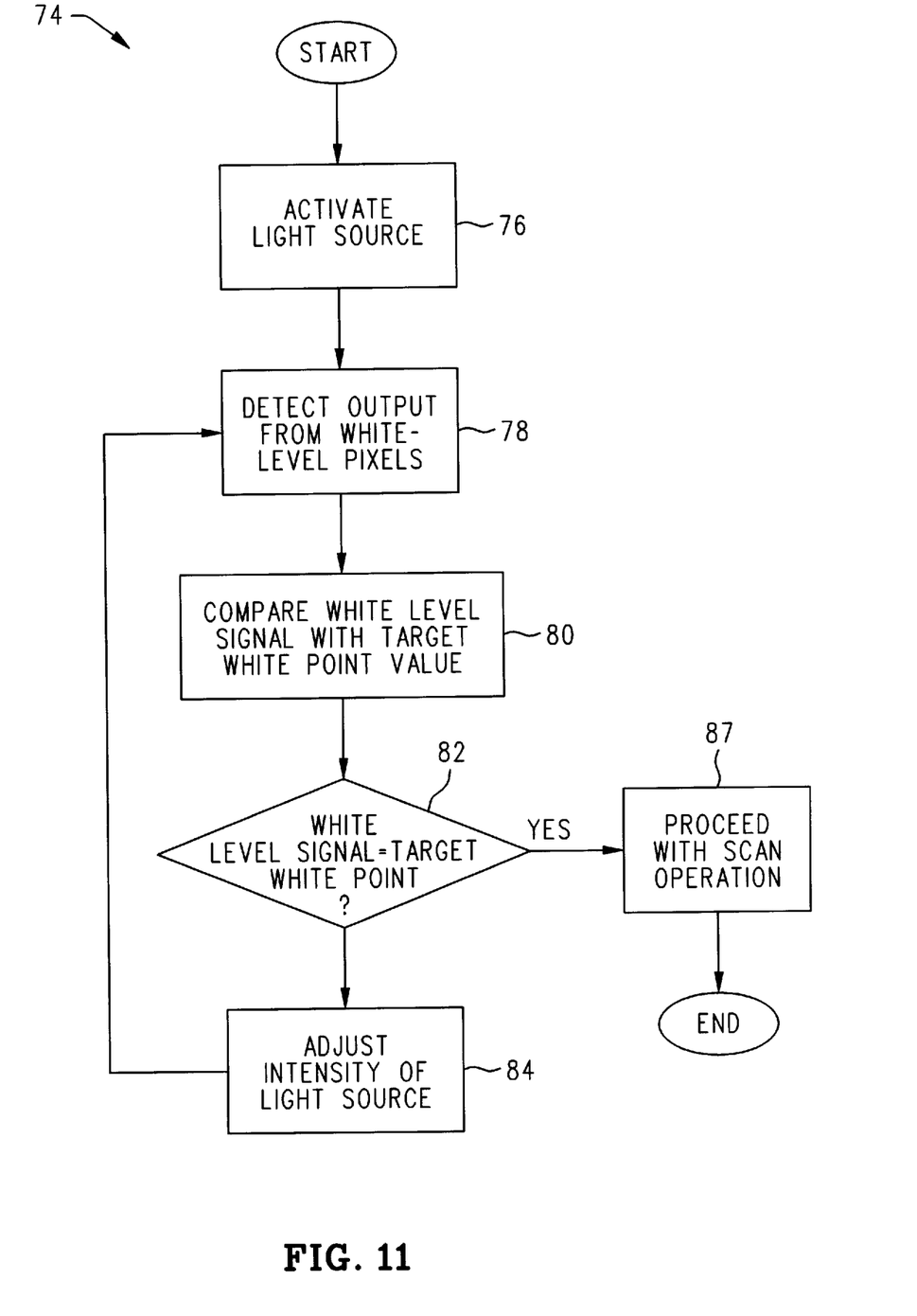
FIG. 11 is a flow diagram of a method for setting a white level according to the present invention.

The illumination and white level calibration system 10 may also periodically perform a white level calibration process 74, as shown in FIG. 11. Basically, the white level calibration process 74 is used to compensate for intensity variations of the light source assembly 40 and to ensure that "white" pixels always correspond to the "white intercept" or "white point" of the scanner. If the white level signal does not correspond to the target white point (usually the "white intercept" or maximum digital value), the intensity of the light source assembly 40 is adjusted until it does. The white level calibration process 74 may be performed each time the user initiates a scan (i.e., each time the user depresses the scan button 34). Alternatively, the white level calibration process 74 may be performed after some predetermined number of scans.

Referring now to FIG. 11, the first step 76 in the white level calibration process 74 is to activate or "turn-on" the light source assembly 40, thereby illuminating the white level reference marks 44 and, of course, the scan region 52. Since the white level reference marks 44 are located near the ends 70, 72 of the scan region 52, light rays (not shown specifically, but indicated generally as the image light 54 in FIG. 5) reflected by the white level reference marks 44 will be directed by the optical system 58 onto the detector 56, whereupon the reflected light rays from the white level reference marks 44 will illuminate at least one pixel 86 (FIG. 8) on the detector 56. The pixel or pixels so illuminated are referred to herein as "white level pixels" 86. The image processing system 29 (FIG. 10) detects the output signal (not shown) from the white level pixel 86 at step 78 and converts it into a white level signal. The white level signal is then compared with a target white point value previously stored in the memory 26 of image processing system 29 at step 80. If the white level signal is equal to the target white point value, as determined during step 82, then the image processing system proceeds to scan the document at step 87. If the white level signal is not equal to the target white point value, then the microprocessor 24 adjusts the intensity of the light source 40 at step 84.

For example, if the white level signal is less than the target white point value, then the microprocessor 24 increases the intensity of the light source 40. Conversely, if the white level signal is greater than the target white point value, then the intensity of the light source 40 is decreased. The program flow then returns to step 78 and the process is repeated until the white level signal is about equal to the target white point value.

A significant advantage associated with the illumination and white level calibration system 10 according to the present invention is that it ameliorates some of the problems associated with the illumination reduction that occurs near each end of the elongate detector, thereby improving the tonal resolution and overall image quality. Another advantage is that the system 10 allows for the periodic re-calibration of the "white point" or "white intercept" of the scanner 10. The periodic white level re-calibration helps to minimize intensity variations of the light source 20, such as may be associated with aging, again improving tonal resolution and overall quality of the scanned image data.

Having briefly described the illumination and white level calibration system 10, as well as some of its more significant features and advantages, the various embodiments of the illumination and white level calibration system according to the present invention will now be described in detail.

Referring back now to FIGS. 2–5, the illumination and white level calibration system 10 is shown as it could be incorporated into a hand-held scanner 12 of the type commonly used to scan an object 14, such as a document 16 with written text 18 thereon. It should be understood, however, that the illumination and white level calibration system 10 could also be used with other types of imaging devices, such as desk-top or flat bed scanners. Consequently, the present invention should not be regarded as limited to use with hand held scanners.

Hand-held scanner 12 may include a housing or body 22 configured to receive the various internal components and systems of the scanner 12, as will be described in detail below. The front side 23 of body 22 may include a plurality of function buttons 30 and scrolling buttons 32. The front side 23 may also include a display device 28, such as a liquid crystal display, for displaying data relating to the function and operation of the scanner 12. The rear side 25 of body 22 may be provided with a scan button 34 and an on/off switch 36, as best seen in FIG. 4. The various function buttons 30, scrolling buttons 32, scan button 34, and on/off switch 36 may be used to control the various functions of the hand scanner 12 and to initiate and terminate scanning of the document 16. The body portion 22 of scanner 12 may also include an electrical power source, such as a battery (not shown), suitable for supplying the scanner 12 with electrical power.

Referring now to FIG. 5, the interior 15 of housing 22 is sized to receive the illumination and white level calibration system 10, the optical system 58, and the image processing system 29. Body 22 may also include a drive roller system 38 to assist the user (not shown) in moving the scanner 12 across the document 16 in the scan direction 20. Drive roller system 38 may include a speed control system 39 to assist in regulating the scanning speed, as will be described in greater detail below.

The illumination and white level calibration system 10 may be mounted within the lower section of the body 22 and may comprise a light source assembly 40 and a lens assembly 42. The light source assembly 40 produces a plurality of light rays 48 which are collimated by lens assembly 42 and directed onto the surface of the document 16 as collimated beam 50. Collimated beam 50 illuminates the scan region 52. Image light 54 reflected by the scan region 52 is captured by the optical system 58 which directs and focuses the image light 54 onto the surface of detector 56. Detector 56 produces output signals which are processed by the image processing system 29 (FIG. 10).

The lens assembly 42 is best seen in FIGS. 5–7 and comprises an elongate collimating lens 46 positioned adjacent an elongate window section 60. The collimating lens 46 collects light rays 48 from the light source assembly 40 and directs them onto the document 16 as a collimated beam 50. Lens 46 may comprise any of a wide variety of lens types, e.g., aspheric, cylindrical, etc., suitable for collecting and collimating light rays 48 produced by the light source assembly 40. In one preferred embodiment, lens 46 comprises an aspheric lens.

Elongate window section 60 is located adjacent the lens 46 and includes an entrance surface 61 and an exit surface 63, as best seen in FIG. 6. Window section 60 transmits image light 54 reflected by the object 14, allowing the image light 54 to be collected by the optical assembly 58. See FIG. 5.

Figure 3:
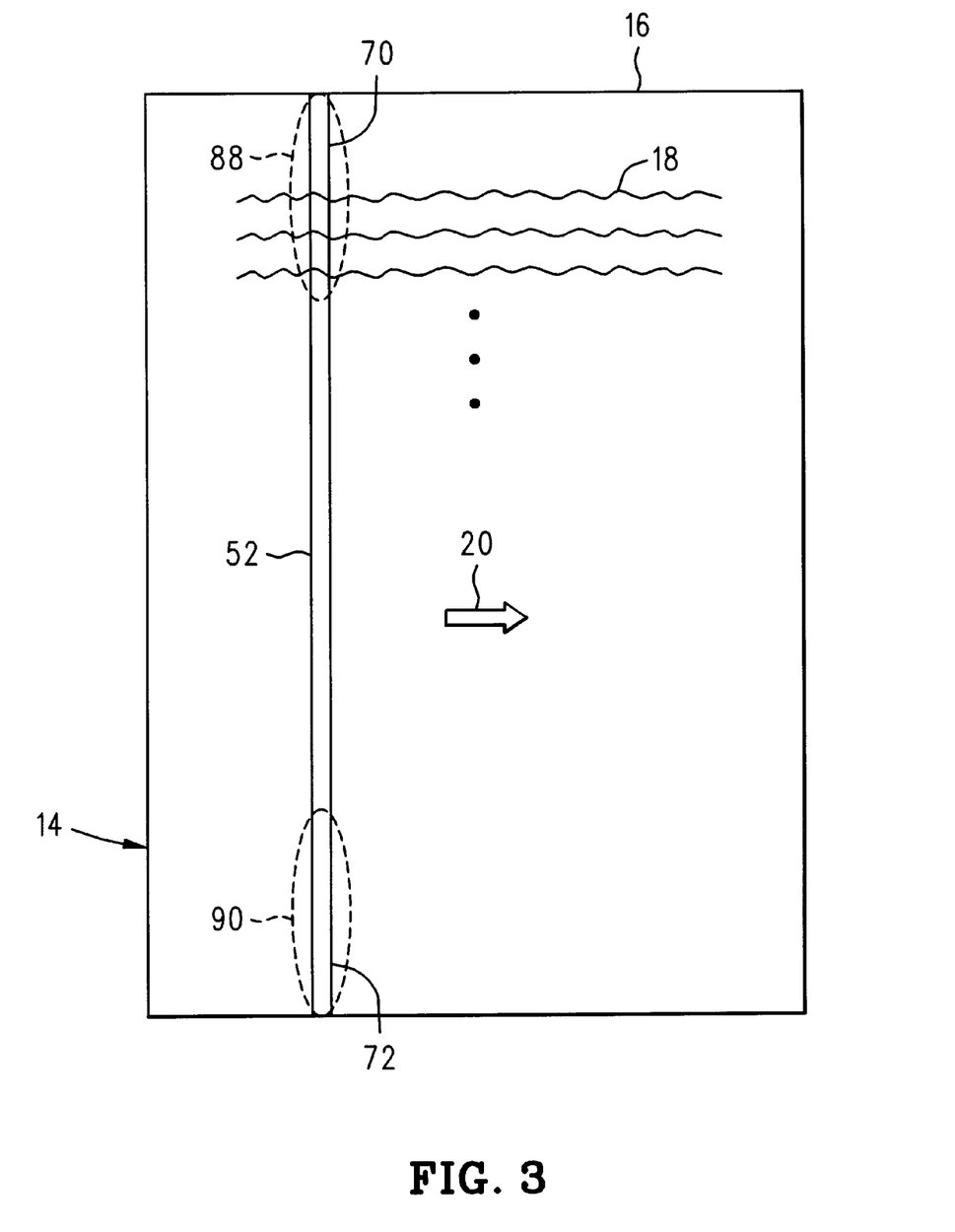
FIG. 3 is a plan view of a document being scanned illustrating the movement of the scan region across the document and showing the zones of increased illumination near each end of the scan region.

In one preferred embodiment, window section 60 may also include a pair spot lenses 62, 64 located at either end of the window section 60, as best seen in FIG. 7. Each spot lens 62, 64 collects additional light rays 66 from light source assembly 40 and directs them toward the document 16 as respective spot light beams (e.g., spot light beam 68). See FIG. 5. The spot light beams (e.g., spot light beam 68) produced by the spot lenses 62, 64 increase the illumination near each end 70, 72 of the scan region 52, creating respective zones of increased illumination 88, 90, as best seen in FIG. 3. The zones of increased illumination 88, 90 help to compensate for the illumination reduction associated with the larger viewing angles θ associated with the extreme ends of the scan region 52. See FIG. 1. Each spot lens 62, 64 may comprise any of a wide range of lens types, e.g., spherical, cylindrical, aspheric, etc., suitable for collecting, collimating and directing light rays 66 onto the document 16 being scanned at positions near each end 70, 72 of the scan region 52.

In one preferred embodiment, the lens assembly 42 comprising the lens 46, window section 60, and spot lenses 62, 64, comprises a single piece of transparent material. While any of a wide range of transparent materials may be used, such as glass, acrylic plastic, and polycarbonate plastic, in one preferred embodiment, the lens assembly 42 is molded from acrylic plastic.

Figure 8:
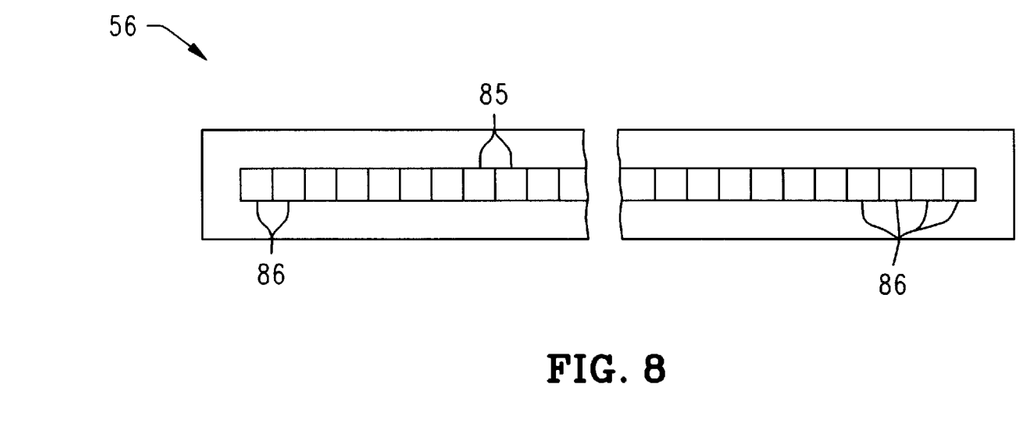
FIG. 8 is an enlarged plan view of a detector array showing the locations of the white level pixels.

The white level reference signal is obtained from a pair of white level reference marks 44 positioned adjacent each spot lens 62, 64, as best seen in FIGS. 6 and 7. Alternatively, a single white level reference mark could be used. In any event, each white level reference mark 44 comprises a small region or area of a highly reflective, preferably white, material, such as highly reflective white paint. Alternatively, each white level reference mark 44 may comprise a white label that may be mounted to near each end of the window section 60 by a suitable adhesive. Each white level reference mark 44 is positioned to intercept a portion of the light rays (e.g., 48, 66) produced by the light source 40. The intercepted light rays are then reflected toward the optical system 58, which in turn directs and focuses the reflected rays on the detector 56. In the case where the detector 56 comprises an array of individual pixels 85, light reflected by the white level reference marks 44 will be incident on a plurality of white level pixels 86 located at either end of the detector array 56, as best seen in FIG. 8. The output signals (not shown) from the white level pixels 86 are then used to set the white level or white intercept of the scanner 12, as will be described in greater detail below.

Referring to FIG. 8, the number of pixels 85 on detector 56 reserved or designated as white level pixels 86 is not particularly critical, so long as a sufficient number of white level pixels 86 are provided to obtain a reliable indication of the light reflected by the white level reference marks 44. In one preferred embodiment utilizing two white level reference marks 44, about fifty (50) pixels 85 at each end of detector 56 are reserved or designated as white level pixels 86. However, a greater or lesser number of pixels could be so reserved or designated.

Figure 9:
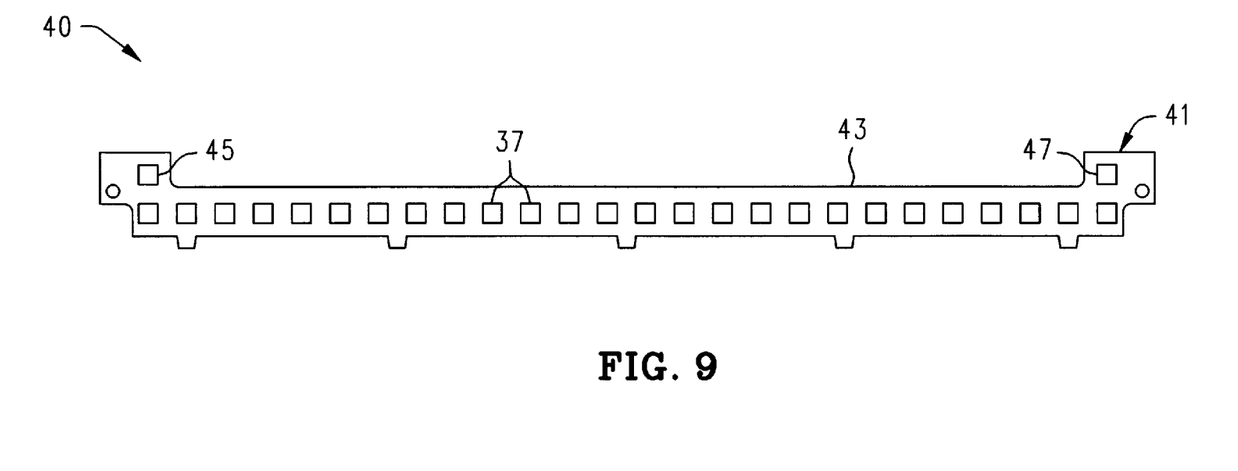
FIG. 9 is a plan view of the LED board used as the light source.

The light source assembly 40 used to produce the light rays 48 and additional light rays 66 is shown in FIG. 9. Light source assembly 40 may comprise an array of light emitting diodes (LEDs) 37 arranged along an elongate, generally flat mounting substrate or board 41. Board 41 may include a plurality of conductors, such as printed circuit paths (not shown), to electrically connect the various LEDs 37 to a suitable connector node or pad (not shown) on board 41. The connector node or pad (not shown) inturn may be connected to a suitable LED driver circuit, such as pulse width modulation circuit 53 (FIG. 10), by any of a wide variety of electrical conductors, such as flexible insulated wire, etc. Board 41 may include an elongate notch section 43 to allow the image light 54 to pass unobstructed from the window section 60 to the optical system 58. See also FIG. 5. Light source assembly 40 may also include a pair of spot light LEDs 45, 47 which provide additional light rays 66 for the spot lenses 62, 64.

As was briefly described above, the optical system 58 collects the image light 54 and focuses it on the surface of the detector 56. It should be noted that the exact type and configuration of the optical system 58 is not particularly critical in achieving the objects of the present invention, and any of a wide range of optical systems may be utilized without departing from the present invention. By way of example, one embodiment of an optical system is shown in FIG. 5 and may comprise a plurality of reflective elements, such as mirrors 92, 94 and a prism 96, to direct the image light 54 to a lens assembly 98. Lens assembly 98 focuses the image light 54 onto the surface of the detector 56. However, since such optical systems are well-known to persons having ordinary skill in the art, the particular optical system 58 used in one embodiment of the invention will not be described in further detail.

The image processing system 29 used to collect and process the image data produced by the detector 56 is best seen in FIG. 10. Essentially, the image processing system 29 may comprise a microprocessor assembly 24 and a memory system 26. The various function buttons 30, scrolling buttons 32, scan button 34, and on/off switch 36 may be connected to the microprocessor 24 and may interact with a software program (not shown) executed by the microprocessor 24 to control the various functions and operations of the scanner 12. The display system 28 may also be connected to the microprocessor 24 and may be used to display for the user data relating to the scanning operation. Of course, the detector 56 is also connected to the microprocessor 24. The image processing system 29 may also include an input/output (I/O) port 57 to allow data to be exchanged with external devices, such as a computer (not shown). I/O port 57 may comprise a standard serial or parallel port or may comprise an infrared port.

As mentioned above, the scanner 12 may include a roller system 38 to assist the user in moving the hand-held scanner 12 over the surface of the object 14 being scanned. See also FIGS. 2 and 5. It is preferred, but not required, that the roller system 38 also include a speed control system 39 (FIG. 10) to assist the user in moving the scanner 12 over the document 16 at the appropriate speed. By way of example, the roller speed control system 39 may include a motor assembly 49 for driving the roller 38 in the appropriate direction. A speed sensor or transducer 51 connected to the motor 49 may be used to provide a feedback signal 65 to the microprocessor 24. Microprocessor 24 then controls the motor assembly 49 as necessary to maintain the proper speed. Examples of such a roller speed control system 39 can be found in U.S. Pat. No. 5,306,908 of McConica, et al., for "Manually Operated Hand-Held Optical Scanner with Tactile Speed Control Assembly" referred to above and which is incorporated by reference for all that it discloses.

The light source assembly 40 comprising LEDs 37, 45, and 47 (FIG. 9), is also connected to the microprocessor assembly 24. Microprocessor assembly 24 may control the light output of the various LEDs by controlling the voltage and/or current delivered thereto. In one preferred embodiment, the various LEDs 37, 45, and 47 are driven by a pulse width modulation (PWM) circuit 53 which is controlled by the microprocessor 24. The pulse width modulation circuit 53 may control the intensity of the LEDs 37, 45, 47 by varying the length of the "on" time of the LEDs. For example, longer pulse widths (i.e., longer "on" times) will produce higher intensities. Shorter pulse widths (i.e., shorter "on" times) will result in lower intensities. Since such pulse width modulation circuits are well-known in the art, the pulse width modulation circuit 53 used in one preferred embodiment of the invention will not be described in further detail.

The hand-held scanner 12 incorporating the illumination and white level calibration system 10 according to the present invention may be operated as follows to scan an object 14, such as a document 16 with written text 18 thereon (FIG. 2). As a first step, the user (not shown) may position the scanner apparatus 12 so that the roller 38 is positioned flat against the surface of the document 16 to be scanned. Then, after making the appropriate selections with the function buttons 30 and/or scrolling buttons 32, the user may initiate the scanning process by pressing the scan button 34 and by sweeping the scanner 12 across the document 16, generally in the scan direction 20. The roller speed control system 39 may be used to assist the user in maintaining the speed of the scanner 12 within a predetermined minimum and maximum speed range.

During the scanning operation, the illumination system 10 illuminates the scan region 52, thereby allowing the detector 56 to sense the information contained in the scan region 52. The spot lenses 62, 64 provide additional illumination 88, 90 near each respective end 70, 72 of the scan region 52 (FIG. 3), thereby helping to compensate for the illumination reduction that would otherwise occur near each end 70, 72 of the scan region 52.

The illumination and white level calibration system 10 may also be used to provide white level calibration for the detector system 56. The white level calibration process 74 shown in FIG. 11 may be periodically performed to ensure that the maximum white level signal, i.e., the white level signal produced by the white level pixels 86, corresponds to the target white point or "white intercept" of the scanner. If it does not, then the microprocessor 24 adjusts the intensity of the light source 40 as necessary until the white level signal is substantially equal to the target white point.

The first step 76 in the white level calibration process 74 is to activate or "turn-on" the light source assembly 40, thereby illuminating the white level reference marks 44 and, of course, the scan region 52. Since the white level reference marks 44 are located near the ends 70, 72 of the scan region 52, light rays (not shown specifically, but indicated generally as the image light 54 in FIG. 5) reflected by the white level reference marks 44 will be directed by the optical system 58 onto the detector 56, whereupon the reflected light rays from the white level reference marks 44 will illuminate the white level pixels 86 (FIG. 8) on the detector 56. The image processing system 29 (FIG. 10) detects the output signals (not shown) from the white level pixels 86 at step 78 and converts them into a white level signal. The white level signal is then compared with a target white point value previously stored in the memory 26 of image processing system 29 at step 80.

Generally speaking, it will be desirable to select the target white point value so that it corresponds to the maximum value or "white intercept" level associated with the particular analog-to-digital (A/D) converter (not shown) used to convert the analog signals from the various pixels 85, 86 of the detector 56 into digital signals. For example, if the image processing system 29 is provided with an 8-bit analog-to-digital converter, then the scanner will be capable of representing $2^8$ or 256 different intensity levels. If the A/D converter returns a maximum value of 255 for a maximum intensity or "white" pixel, then the target white point value will usually be selected to be 255. Of course, the target white point value may differ depending on the particular design of the image processing system and the A/D converter. Consequently, the target white point value should not be regarded as limited to any particular value or range of values.

Still referring to FIG. 11, if the white level signal is equal to the target white point value, as determined during step 82, then the image processing system proceeds to scan the document at step 87. If the white level signal is not equal to the target white point value, then the microprocessor 24 adjusts the intensity of the light source 40 at step 84. For example, if the white level signal is less than the target white point value, then the microprocessor 24 will increase the "on" time of the PWM signal used to activate the LEDs, thus increasing their intensities. Conversely, if the white level signal is greater than the target white point value, then the intensity of the light source 40 is decreased by decreasing the "on" time of the PWM signal. The program flow then returns to step 78 and the process is repeated until the white level signal is equal to the target white point value.

Periodically performing the white level calibration process 74 will help to ensure that the maximum tonal resolution of the scanner 12 is maintained. For example, in one preferred embodiment, the white level calibration process 74 is performed at the beginning of each scan operation, i.e., immediately after the user depresses the scan button. Once the process is complete, the scanner 12 will proceed with the scan operation, e.g., the microprocessor 24 will activate the drive roller assembly 38. Alternatively, the white level calibration process 74 could be performed less frequently, such as after every 10 or even 100 scan operations. The white level calibration process 74 may also be presented to the user as an option on the display device 28, and the user may elect to perform the calibration process 74 at any convenient time.

It is contemplated that the inventive concepts herein described may be variously otherwise embodied and it is intended that the appended claims be construed to include alternative embodiments of the invention except insofar as limited by the prior art.

What is claimed is:

1. An illumination system for illuminating a scan region on an object and for providing a white level reference for a detector, comprising:

a light source for producing a plurality of light rays;

an elongate lens having a first end and a second end, said elongate lens being positioned between said light source and the scan region, the scan region comprising an elongate scan line having a first end and a second end, said lens collecting some of the light rays from said light source and directing the collected light rays onto the scan region;

a first spot lens positioned adjacent the first end of said elongate lens;

a second spot lens positioned adjacent the second end of said elongate lens, said first and second spot lenses also being positioned adjacent said light source so that some of the light rays from said light source are directed toward the first and second ends of the elongate scan line by said first and second spot lenses, respectively; and a white level reference mark positioned adjacent said lens and said light source so that some of the plurality of light rays from said light source are reflected by said white level reference mark to the detector.

2. The illumination system of claim 1, wherein said lens comprises an aspheric lens.

3. The illumination system of claim 2, wherein said light source comprises a light emitting diode.

4. The illumination system of claim 1, further comprising a window positioned adjacent said lens and the scan region, the image light reflected by the scan region passing through said window before being incident on the detector.

5. The illumination system of claim 4, wherein said white level reference mark is positioned on said window.

6. The illumination system of claim 5, wherein said lens and said window comprise a single piece of transparent material.

7. The illumination system of claim 1, wherein said light source includes a first spotlight positioned adjacent said first spot lens and a second spotlight positioned adjacent said second spot lens.

8. The illumination system of claim 1, further comprising:

white level detection apparatus operatively associated with the detector for detecting a white level signal;

comparison apparatus operatively associated with said white level detection apparatus for comparing the white level signal with a target white level; and light source intensity varying apparatus operatively associated with said comparison apparatus and said light source for varying an intensity of the light rays produced by said light source.

9. The illumination system of claim 8, wherein said light source intensity varying apparatus comprises a pulse width modulation circuit for modulating a pulse width of a light activation signal.

10. An illumination system for illuminating a scan region on an object and for providing a white level reference for a detector, comprising:

a light source for producing a plurality of light rays;

an elongate lens member having a first end and a second end, said elongate lens member being positioned between said light source and the scan region, said elongate lens member collecting some of the light rays from said light source and directing the collected light rays onto the scan region;

a first spot lens positioned adjacent the first end of said elongate lens member and said light source so that some of the plurality of light rays from said light source are collected by said first spot lens and directed onto the scan region;

a second spot lens positioned adjacent the second end of said elongate lens member and said light source so that some of the plurality of light rays from said light source are collected by said second spot lens and directed onto the scan region;

a first white level reference mark positioned adjacent said first spot lens and said light source so that some of the plurality of light rays from said light source are reflected by said first white level reference mark to the detector.

11. The illumination system of claim 10, further comprising an elongate window having a first end and a second end, said elongate window being positioned adjacent said elongate lens member and said scan region so that image light reflected by said scan region passes through said elongate window member before reaching the detector.

12. The illumination system of claim 11, further comprising a second white level reference mark positioned adjacent said second spot lens and said light source so that some of the plurality of light rays from said light source are reflected by said second white level reference mark to the detector.

13. The illumination system of claim 12, wherein said elongate lens member, said first and second spot lenses, and said elongate window member comprise a single piece of transparent material.

14. The illumination system of claim 13, wherein said transparent material comprises an acrylic plastic material.

15. The illumination system of claim 14, wherein said first and second white level reference marks are positioned on said elongate window member at about the first and second ends of said elongate window member.

16. The illumination system of claim 10, wherein said light source comprises a plurality of light emitting diodes.

17. The illumination system of claim 16, further comprising a first spotlight positioned adjacent said first spot lens and a second spotlight positioned adjacent said second spot lens.

18. Scanner apparatus for scanning a scan region on an object, comprising:

a light source for producing a plurality of light rays;

an elongate lens having a first end and a second end, said elongate lens being positioned adjacent said light source, said elongate lens collecting some of the light rays from said light source and directing them onto the scan region, wherein the scan region comprises an elongate scan line having a first end and a second end;

a first spot lens positioned adjacent the first end of said elongate lens member;

a second spot lens positioned adjacent the second end of said elongate lens member, said first and second spot lenses also being positioned adjacent said light source so that some of the light rays from said light source are directed toward the first and second ends of the elongate scan line by said first and second spot lenses, respectively;

a detector for producing output signals relating to light incident thereon;

an optical system for collecting image light reflected by the scan region and focusing the image light onto said detector;

a first white level reference mark positioned adjacent said lens and said light source so that some of the plurality of light rays from said light source are reflected by said first white level reference mark to said optical system, said optical system collecting the reflected light rays from said first white level reference mark and focusing the reflected light rays from said first white level reference mark onto said detector; and image processing apparatus connected to said detector and responsive to the output signals produced by said detector, said image processing apparatus producing image data signals.

19. The scanner apparatus of claim 18, wherein said first white level reference mark is positioned adjacent the first end of said elongate lens member and further comprising a second white level reference mark positioned adjacent the second end of said elongate lens member.

20. The scanner apparatus of claim 19, further comprising an elongate window member having a first end and a second end, said elongate window member being positioned adjacent said elongate lens member and the scan region so that image light from said scan region passes through said window member before reaching said detector.

21. The scanner apparatus of claim 20, wherein said elongate lens member, said first and second spot lenses, and said elongate window member comprise a single piece of transparent material.

22. The scanner apparatus of claim 21, wherein said transparent material comprises an acrylic plastic material.

23. The scanner apparatus of claim 18, further comprising:

white level detection apparatus operatively associated with said detector for detecting a white level signal;

comparison apparatus operatively associated with said white level detection apparatus for comparing the white level signal with a target white level; and light source intensity varying apparatus operatively associated with said comparison apparatus and said light source for varying an intensity of the light rays produced by said light source.

24. The scanner apparatus of claim 23, wherein said light source intensity varying apparatus comprises a pulse width modulation circuit for modulating a pulse width of a light activation signal.

25. An illumination system for illuminating a scan region on an object and for providing a white level reference for a detector, comprising:

a light source for producing a plurality of light rays;

an elongate lens having a first end and a second end, said elongate lens being positioned between said light source and the scan region, said lens collecting some of the light rays from said light source and directing the collected light rays onto the scan region;

a first white level reference mark positioned adjacent the first end of said lens; and a second white level reference mark positioned adjacent the second end of said lens, said first and second white level reference marks reflecting to the detector some of the light rays from said light source.

* * * * *